United States Patent Office 3,515,784
Patented June 2, 1970

3,515,784
BIOCIDAL METHODS
Gerhard R. Wendt, Havertown, and Kurt W. Ledig, Philadelphia, Pa., assignors to American Home Products Corporation, New York, N.Y., a corporation of Delaware
No Drawing. Continuation-in-part of application Ser. No. 610,005, Jan. 18, 1967. This application Feb. 27, 1968, Ser. No. 708,521
Int. Cl. A61k 17/00
U.S. Cl. 424—238    5 Claims

ABSTRACT OF THE DISCLOSURE

Means are provided to control the growth of microorganisms, especially pathogenic bacteria, fungi, protozoa, amebae, and the like, and also helminths comprising contacting said microorganisms and helminths with a biocidal composition containing as the active biocidal agents, funtumine or funtumidine.

---

This application is a continuation-in part of the copending application Ser. No. 610,005, filed Jan. 18, 1967 now abandoned.

This invention deals with biocidal methods and compositions. More particularly it is concerned with methods to inhibit the growth of microorganisms, especially pathogenic bacteria, fungi, protozoa, amebae, and the like, and also helminths, comprising the use of new biocidally-active compositions including funtumine or funtumidine as active ingredients.

DESCRIPTION OF THE INVENTION

The process contemplated by the instant invention is in essence: a method for the inhibiting the growth of microorganisms or helminths which comprises contacting said microorganisms or helminths with a biocidally-effective concentration of a compound of the formula

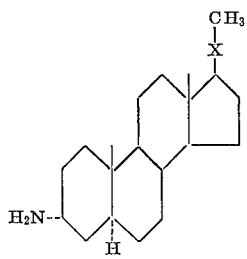

wherein X is

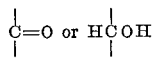

Also contemplated by this invention is a biocidally-active composition comprising a carrier and a biocidally-effective concentration of a biocidal agent, said biocidal agent consisting essentially of a compound as defined above.

Special mention is made of several important embodiments of this invention. These are:

A method as first above defined wherein said microorganisms are selected from the group of pathogenic bacterial (including Gram-positive and Gram-negative types), fungi, protozoa, and amebae, consisting of:

Bacillus subtilis
Staphylococcus aureus
Mycobacterium smegmatis
Neisseria catarrhalis
Escherichia coli
Escherichia intermedia
Salmonella paratyphi
Enterobacter aerogenes
Klebsiella pneumoniae
Bordetella bronchiseptica
Trichomonas vaginalis
Histoplasma capsulatum and
Endameba histolytica;

and the helminth is a Strongylidae sp.

A method as first above-defined wherein said compound is funtumine, a compound of the above formula wherein X is >C=O;

A method as first above-defined wherein said compound is funtumidine, a compound of the above formula wherein X is >C(H)OH;

A method as first above-defined wherein said microorganisms or helminths are contacted with a concentration of from about 0.001% to about 1% of a compound of the above formula; and A composition as above defined wherein said biocidal agent is present at a concentration of from about 0.001% to about 5% by weight per part by weight of said composition.

The biocidally-active compounds of this invention, funtumine and funtumidine, can be prepared by techniques well known to those skilled in the art. One especially convenient means comprises isolating them from plants of the genus Funtamia (Apocynaceae) and more particularly from the species F. latifolia. In one manner of proceeding, parts of a Funtumia latifolia plant, such as the leaves, trunk, bark or roots, are crushed and extracted with petroleum ether; the extract then is rendered alkaline, for example, with 20% ammonia or 10% or 5% sodium carbonate, or milk of magnesia, or the like; the resulting product is subjected to the extraction action of a solvent, such as ether, benzene, chloroform, ethyl acetate, mixtures thereof, and the like; the product is mixed with an acid solution such as an acetic, hydrochloric or oxalic acid solution; the acid solution is separated and rendered alkaline to dissociate the alkaloids; the alkaloids (funtumine and funtumidine) are extracted with a solvent, such as ether, chloroform, ethyl alcohol, methyl alcohol, mixtures thereof, and the like; and the funtumine and funtumidine are separated, one from the other, by fractional crystallization or by chromatography of a benzene solution on a column of alumina or silica gel, or the like, using benzene as an eluant, funtumine coming off the column before funtumidine. The products can be purified, if desired, by crystallization from a solvent such as a lower alkanol, e.g., methanol.

The method of this invention contemplates inhibiting and killing microorganisms, especially pathogenic microorganisms, and helminths of the type above-mentioned. "Biocidal activity" contemplates, especially, anti-bacterial, anti-protozoal, anti-fungal, anti-amebic, anthelmintic activities, and the like. The discovery of these activities permits application of the instant biocidal compositions in a variety of important fields of use. For example, they can be formulated and used in biocidally-active industrial cleaning compositions, liquid shampoos, hair rinses, and creams which are biocidally active and intended for veterinary use, similarly in soaps and cosmetic detergents and in biocidally-active wash solutions to decontaminate premises or pastures which have been infected with, for example, horse strongyles. The instant methods and compositions can be used to prevent the growth of mold, and in the protection of soil, plants, and seeds; also in the protection of leather and wood; and in disinfecting aerosols and lubricating oils. They are applied according to end-use as powders, solutions, suspensions, and the like.

Illustrative of the biocidal properties of funtumine and funtumidine are bacterio-static data obtained against both Gram-positive and Gram-negative bacteria by an agar serial dilution technique:

A stock solution is made at 10,000 µg./ml. in distilled water. Two-fold dilutions are made with sterile water. One ml. quantities of each dilution are incorporated in 9 ml. of Seed agar in sterile petri dishes. The hardened surface is inoculated with test organisms and the plates are incubated for 18 hours at 35° C. The endpoint is the minimal inhibitory concentration (MIC) expressed in µg./ml.; i.e., the least amount of material that completely inhibits the test organism. Against the following microorganisms, funtumine was found to possess the antibacterial activity expressed as MIC as follows:

| Gram, type | | MIC |
|---|---|---|
| + | Bacillus subtilis | 125 |
| + | Staphylococcus aureus (4 strains) | 250, 125, 125, 125 |
| + | Mycobacterium smegmatis | 125 |
| − | Neisseria catarrhalis | 250 |
| − | Escherichia coli | 125 |
| − | Escherichia intermedia | 250 |
| − | Salmonella paratyphi | 250 |
| − | Enterobacter aerogenes | 62.5 |
| − | Klebsiella pneumoniae | 125 |
| − | Bordetella bronchiseptica | 250 |

In addition to its spectrum of activity against both Gram positive and Gram negative bacteria funtumine surprisingly was found to be active against a penicillin-resistant strain of *Staphylococcus aureus* (53–180). Against the following microorganisms, funtumidine was found to possess the Gram positive and Gram negative anti-bacterial activity expressed as MIC as follows:

| Gram, type | | MIC |
|---|---|---|
| + | Bacillus subtilis | 125 |
| + | Staphylococcus aureus (2 strains) | 250, 250 |
| − | Escherichia coli | 250 |
| − | Enterobacter aerogenes | 250 |

Further illustratiton of the biocidal properties of the compounds employed in this invention are results of tests to determine anti-protozoal, especially trichomonicidal activity.

A 12.5 mg. portion of test material (as based on active moiety) is added to 2.5 ml. of 1% phosphate buffer, pH 6. Further two-fold dilutions are made in the same buffer. A 1 ml. volume of each dilution is transferred to small sterile screw cap assay tubes containing 3.8 ml. of Diamond medium (formula furnished by American Type Culture Collection, Rockville, Md.) and 0.1 ml. of calf serum. Each assay tube is inoculated with 0.1 ml. of a 48–72 hour culture of *Trichomonas vaginalis* strain ATCC No. 13972. A control assay tube containing no test material is similarly inoculated. The assay tubes are gently shaken and then incubated for 48 hours at 30° C. Following incubation the tubes are gently shaken and with the aid of a Pasteur pipette a drop is deposited on a Spiers-Levy eosinophil counting chamber. The chamber is examined by phase contrast microscopy. The number of organisms present in 1 mm.$^2$ is multiplied by 5000 in order to express the count per ml. The difference in the number of organisms present in the control tube and in the tubes containing the test material represents the relative potency of the test material and is expressed as the percentage kill at the specific dose level. Metronidazole may be used as a suitable positive control test material.

In these tests, funtumine caused 100% kill of *Trichomonas vaginalis* at 100 µg./ml. and funtumidine caused 100% kill of *Trichomonas vaginalis* at 1000 µg./ml.

As a further illustration of trichomonicidal activity, the ability of funtumine to inhibit in vivo a subcutaneous abscess induced by *Trichomonas vaginalis* was demonstrated in mice.

Albino mice, 18–20 grams, are implanted subcutaneously in the nape of the neck with 1.76 x 10$^6$ cells of *T. vaginalis* suspended in Diamond's medium (day 0). On day 1, the mice are randomized into test groups and treatment is initiated. All animals are dosed intraperitoneally once daily with 40 mg./kg. of funtumine. On day 5, all animals are injected intravenously with 0.1 ml. of Evans blue in order to accentuate the abscessed area. On day 6 all animals are sacrificed and autopsied. The degree of infection is scored 0 to 4. Treated to control ratios are then obtained. Final results are expressed as percent inhibition of infection. Funtumine tested in 6 animals, scored 2.7 with an inhibition of the infection of 23%.

Still a further illustration of the biocidal properties of the instant compositions is demonstrated by determining their anthelmentic activity against horse strongyle (parasite) ova.

Different concentrations of the test compounds are mixed with horse feces containing strongyle (parasite) ova. After a week the sample is observed for strongyle larva. Living strongyle larvae indicate no activity of the drug. Lack of strongyle larva indicate drug activity against the parasite.

In this test, funtumine at 0.5% by weight concentration provided a medium in which no larva observed—complete protection; funtumidine at the same concentration caused a decrease of from ⅕ to ½ of the larva found in the control sample.

Yet another illustration of the biocidal activity of the instant compositions is demonstrated by results of tests to determine anti-fungal activity, especially against *Histoplasma capsulatum*.

A 50 mg. portion of test material is solubilized or suspended in 5 ml. of sterile distilled water. Further two-fold dilutions are made in the same solvent. A 0.2 ml. volume of each dilution is transferred to a sterile stainless steel capped 13 x 100 mm. culture assay tube containing 1.8 ml. of Brain heart infusion fortified with 10% sheep blood; the agar infusion is in a molten stage at 47–48° C. The assay tube contents are well mixed and the agar is allowed to solidify as a slant. Each slant is inoculated with the yeast phase of *Histoplasma capsulatum* ATCC No. 11407 which has been grown for at least 96 hours in the same medium at 35° C.; the growth of the inoculum slant is suspended in 2 ml. sterile distilled water and a drop of the suspension delivered by a Pasteur pipette is used to inoculate each assay tube slant. The assay tubes are incubated for 6 days at 35° C. the Assay tube containing the least amount of test material which completely inhibits growth is reported as the minimal inhibitory value and is reported in terms of µg./ml.

In these tests, funtumine caused 100% kill of *Histoplasma capsulatum* at 250 µg./ml. and funtumidine caused 100% kill of *Histoplasma capsulatum* at 31.3 µg./ml.

An additional illustration of the biocidal activity of the instant compositions is demonstrated in the results of tests to determine anti-amebic activity, especially against *Endameba histolytica*.

The test substance is incorporated and diluted in the aqueous phase of Boeck-Drbohlav diphasic medium fortified with rice starch. The medium is inoculated with polybacteria and a known number of trophozoites of *E. histolytica* NIH 200. After 48 hours incubation at 35° C., the trophozoites are counted. The procedure is derived from Thompson et al., Antibio. and Chemo., 6, 337–50 (1956). The endpoint is expressed as Minimal Inhibitory Concentration (MIC) in µg./ml.; and is the least amount of substance that completely inhibits *E. histolytica*.

In this test funtumine had a MIC of 15.6 µg./ml.; and funtumidine had a MIC of 31.3 µg./ml.; both were highly amebicidal.

The compounds of the above formula, funtumine and funtumidine, are useful in a number of compositions comprising the active compound and a germicidally inert material, speaking relatively. For example some soaps and detergents possess a bactericidal action, but such action, relative to those of the instant active compounds, is weak and of little effect in comparison with the overall germicidal activity of the composition. In such compositions, while the active compounds of this invention may be employed in concentrations as low as 10 p.p.m., from a practical point of view, it is desirable to use from about 0.001% by weight, to about 5% by weight or more. Particularly useful compositions of the present invention comprise veterinary soaps and detergents in which the active compounds of this invention may be employed in concentrations of 0.1% to 0.7% by weight, or even as much as 1%, 1.5%, 1.8%, 2% and up to about 5%. Furthermore, in washing solutions for pastures and barns, the active compounds of this invention may be used generally in the range of from 0.02% to .25% by weight.

Although, in common with most organic substances with relatively high molecular weights, funtumine and funtumidine have limited solubility in water, those skilled in the art will have no great difficulty in formulating them into a wide variety of biocidally-active compositions. The examples hereinafter will provide details for doing so in representative instances. However, in general, standard techniques can be employed and, where necessary, advantage is taken of the basic nature of the compounds to form acid addition salts, such as the hydrochloride, nitrate, hydrobromide, tartrate, citrate, gluconate, and the like, which have enhanced solubility in water. The active compounds per se can be made up in dilute aqueous solution. They can, in addition, where required be made up into more concentrated formulations with solvents such as ether, chloroform, ethyl alcohol, methyl alcohol and the like, or in mixtures thereof. They can also be formulated as suspensions or solutions in an aqueous vehicle containing an organic co-solvent, such as, for example, a lower alkanol, such as methanol. These make useful mixtures to decontaminate premises or pastures. Also, aqueous vehicles containing emulsifying agents, such as sodium lauryl sulfate, and relatively high concentrations, e.g., up to about 5% by weight, of funtumine or funtumidine can be formulated by conventional techniques.

DESCRIPTION OF THE PREFERRED EMBODIMENTS

The following examples are illustrative of compositions contemplated by the instant invention. They are intended to aid in understanding and using the invention but are not to be construed to limit the scope thereof in any manner whatsoever.

Example 1

A biocidally-active wash solution is prepared as follows:

| Components: | Parts by wt. |
|---|---|
| Potassium tripolyphosphate | 19.5 |
| Sodium tripolyphosphate | 5.0 |
| Alkyl aryl sulfonate anionic detergent | 33.0 |
| Lauric acid alkanolamine condensate | 5.0 |
| Carboxymethylcellulose | 0.5 |
| Funtumine | 1.0 |

The above components are mixed together at 22° C. to form the final product. A similar product is prepared substituting funtumidine for funtumine.

Example 2

A biocidally-active industrial cleaning composition is prepared as follows:

| Components: | Parts by wt. |
|---|---|
| Neutral soap (K and Na soaps of stearic, palmitic and oleic acid) | 30.0 |
| Bentonite | 30.0 |
| Sodium lauryl sulfate | 10.0 |
| Lanolin | 5.0 |
| Funtumine | 1.5 |

The bentonite and sodium lauryl sulfate are mixed together. The soap and lanolin are mixed with the funtumine and heated to about 70° C., after which they are mixed with the bentonite and sodium lauryl sulfate. The product may then be pressed into cake form, or 27 parts of corn meal may be mixed with 75 parts of the mixture to form a powdered biocidally-active soap composition. A similar product is prepared substituting funtumidine for funtumine.

Example 3

A liquid shampoo with biocidal activity for veterinary use is prepared as follows:

| Components: | Parts by wt. |
|---|---|
| Coconut oil fatty acids | 42.0 |
| Oleic acid | 56.0 |
| Propylene glycol | 55.0 |
| Triethanolamine | 58.0 |
| Funtumine | 1.5 |

The fatty acids are intermixed after which first the triethanolamine and then the propylene glycol are added. The mixture is stirred until a clear solution is obtained after which the funtumine is added. All the mixing takes place at about 22° C. The above mixture is diluted with water to any desired consistency. During this addition of water, the mixture assumes a petrolatum-like consistency but gradually changes to a clear, very slightly viscous solution. If the solution becomes cloudy, more of the triethanolamine is stirred in, a little at a time, until the solution again becomes clear. The final product preferably contains about 3 parts by weight of water to about 1 part by weight of the above mixture. A similar product is prepared substituting funtumidine for funtumine.

Example 4

A biocidally-active hair rinse for veterinary use is prepared in the following manner:

| Components: | Parts by wt. |
|---|---|
| Glyceryl monostearate | 3.0 |
| Water | 95.0 |
| Funtumine | 2.0 |

These ingredients are thoroughly intermixed at about 22° C. to form the final product. A similar product is prepared substituting funtumidine for funtumine.

Example 5

A biocidally-active cream for veterinary use is prepared as follows:

| Components: | Parts by wt. |
|---|---|
| Mineral oil | 47.9 |
| Beeswax | 6.0 |
| Spermaceti | 6.0 |
| Cetyl alcohol | 1.0 |
| Lanolin | 1.0 |
| Water | 38.0 |
| Funtumine | 0.1 |

The mineral oil, beeswax, spermaceti, cetyl alcohol and lanolin are mixed with the funtumine and the mixture is heated to form a melt. It is then cooled to 50° C. and the water is added with continuous stirring. It is then cooled, with continuous stirring to 25°–30° C. to give the final product. A similar product is prepared substituting funtumidine for funtumine.

Example 6

A biocidally-active composition useful to decontaminate premises or pastures which have been infected with horse strongyles or other members of the Strongylidae family, for example, hookworm, Trichostrongylidae or Metastrongylidae, is prepared by dissolving funtumidine in methanol and adding water to provide a concentration of 3.0 g. of funtumine per liter of formulation. If, during formulation, the addition of water causes the active compound to precipitate, more of the co-solvent (methanol) is added. A similar product is prepared substituting funtumidine for funtumine.

We claim:
1. A method for inhibiting the growth of pathogenic microorganisms or helminths which comprises administering by injection to an animal in which the pathogenic bacteria, fungi, protozoa, amebae or helminths are present, a biocidally-effective amount of a compound of the formula

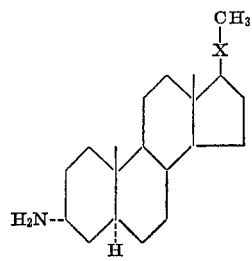

wherein x is

or

2. A method as defined in claim 1 wherein said pathogenic microorganisms are selected from the group consisting of *Bacillus subtilis, Staphylococcus aureus, Mycobacterium smegmatis, Neisseria cartarrhalis, Escherichia coli, Escherichia intermedia, Salmonella paratyphi, Enterobacter aerogenes, Klebsiella pneumoniae, Bordetella bronchiseptica, Trichomonas vaginalis, Histoplasma capsulatum,* and *Endameba histolytica,* and said helminth is a Strongylidae sp.

3. A method as defined in claim 1 wherein said compound is funtumine.

4. A method as defined in claim 1 wherein said compound is funtumidine.

5. A method as defined in claim 1 wherein said animal is administered a composition containing from about 0.001% to 5% by weight of a compound as defined in claim 1.

References Cited
UNITED STATES PATENTS 3,098,859    7/1963    Mainil _____ 424—238

ALBERT T. MEYERS, Primary Examiner

J. D. GOLDBERG, Assistant Examiner